United States Patent

Bell et al.

[11] Patent Number: 5,146,258
[45] Date of Patent: Sep. 8, 1992

[54] MULTIPLE PHOTODIODE ARRAY FOR LIGHT METERING

[75] Inventors: Cynthia S. Bell, Webster; Constantine N. Anagnostopoulos, Mendon; Paul M. Williams, Rochester; Michael J. Gaboury, Spencerport; James R. Koudelka, Williamson, all of N.Y.

[73] Assignee: Eastman Kodak Company, Rochester, N.Y.

[21] Appl. No.: 632,704

[22] Filed: Dec. 24, 1990

[51] Int. Cl.$^5$ .................. G03B 7/099; H01J 40/14; G01J 1/42
[52] U.S. Cl. .................. 354/432; 250/208.6; 356/222
[58] Field of Search .............. 354/429, 432, 430, 431; 250/201.2, 201.6, 208.1, 208.6; 356/222

[56] References Cited

U.S. PATENT DOCUMENTS

| | | | |
|---|---|---|---|
| 4,075,640 | 2/1978 | Ueda et al. | 354/432 |
| 4,309,091 | 1/1982 | Fukuhara et al. | 354/432 |
| 4,364,650 | 12/1982 | Terashita et al. | 354/432 |
| 4,394,078 | 7/1983 | Terashita | 354/432 |
| 4,684,995 | 8/1987 | Baumeister | 354/429 X |
| 4,721,976 | 1/1988 | Aihara et al. | 354/429 X |
| 4,937,611 | 6/1990 | Miyazaki | 354/432 |
| 4,969,005 | 11/1990 | Tokunago | 354/432 |
| 4,974,007 | 11/1990 | Yoshida | 354/432 |

FOREIGN PATENT DOCUMENTS

| | | | |
|---|---|---|---|
| 56-102838 | 8/1981 | Japan | 354/432 |
| 2-20840 | 1/1990 | Japan | 354/429 |

Primary Examiner—W. B. Perkey
Attorney, Agent, or Firm—Mark Z. Dudley

[57] ABSTRACT

In the present invention there is provided a plurality of photosensitive elements arranged in a symmetrical pattern around a central circular area. The area surrounding the central area is formed of a square area having the circular area at its center with the square area divided into four equal quadrants. The next area is rectangular in shape and surrounds the second area. The rectangular area is formed in four equal sections with each of the corners of the square area lying along two adjacent edges of the rectangular areas. A selection means is provided for selecting the output signal from any one the photodiodes or for selecting the output signals from any combination of two or more of the photodiodes so as to accentuate the responsiveness of the light meter to a selected area or feature of the image to be photographed.

16 Claims, 4 Drawing Sheets

MULTIPLE PHOTODIODE ARRAY FOR LIGHT METERING

FIELD OF THE INVENTION

The present invention relates to light measuring devices and more particularly to a camera light meter that is formed with a plurality of photosensitive elements arranged in a pattern that provides for improved backlit subject detection.

BACKGROUND OF THE INVENTION

The majority of cameras today use a single photodiode cell to perform light metering. The single photocell is arranged to measure the average of the lower center portion of the scene as illustrated in FIG. 1. This works reasonably well because consumers usually frame their subject in this part of the picture. One of the biggest problems with in-camera light meters is that they measure subject brightness rather than incident illumination. The light meters must be calibrated so that they correlate to the incident illumination. They are typically calibrated on the assumption that the scene reflectivity is 14%, which is not always a valid assumption. By averaging over smaller areas, the multi-cell photometer acquires more information about the scene contrast. This data can be used to categorize scenes and to apply the proper reflection factor.

Camera manufacturers have begun to utilize multiple photocells to measure segments of the scene independently. This is described in a number of journal articles, such as in the Camerart article, "How Does 'Multi-Segment' Metering of SLRs Work", Feb. 1989 pp. 13-17. The patterns that have been employed leave room for improvement. Some of the patterns are designed to improve backlit subject detection, such as the Ricoh Mirai and the Minolta Dynax patterns illustrated in FIGS. 2 and 3, respectively. The pattern in the Canon EOS cameras, illustrated in FIG. 4, have the scene split into quadrants, which is useful for evaluating the subject against its foreground, the sky or background. Yet in all of these cases, if the subject is small or at a distance so that it appears small or further if the subject is not centered, or if the subject is two persons these patterns will not detect problematic lighting.

In Kawamura et al. U.S. Pat. No. 4,322,142, entitled "Single-Lens Reflex Camera Light Measurement and Exposure Control Apparatus" there is disclosed the use of three light measuring elements. The first element is used for the average measurement of the light reflected from a movable mirror during object observation. The second element is used for spot metering on an object from the light projected through the plane of the movable mirror, and the third element is located to receive reflected object light from the film surface and/or the shutter curtain surface. The patterns for the light measuring elements are shown in FIGS. 4A and 4B of the patent.

Another patent of interest is Tsunekawa U.S. Pat. No. 4,704,024, entitled "Photometric Circuit for Camera". In that patent there is shown a light meter that has a photo-electric conversion element for measuring the light in the middle part of the angle of view of the camera and a plurality of photo-electric conversion elements arranged to measure light in the peripheral parts of the angle of view. The patterns for these elements are shown in FIGS. 7A, 7B, 9, and 11 of the patent.

Also of interest are the teachings of Yamada et al. U.S. Pat. No. 4,774,401, entitled "Light Measuring Device Variably Controlled According to Focus Mode Selection". In that patent the light sensor uses silicon photodiodes that are divided into a central portion of the picture plane and three concentric parts around the central portion. FIGS. 1, 3, 5, and 6 of that patent illustrate the patterns used for the photoelements.

SUMMARY OF THE INVENTION

In the present invention there is provided a plurality of photodiode (photosensitive) elements arranged in a symmetrical pattern around a central circular area. The first area surrounding the central area is formed of a square area having the circular area at its center with the square area divided into four quadrants. The next or second area is substantially rectangular in shape and surrounds the first area. The second area is formed in four equal sections. Selection circuitry is provided for selecting the output signals from any one the photodiodes or for selecting the output signals from any combination of two or more of the photodiodes so as to customize the responsiveness of the light meter to a selected area or feature of the image to be photographed.

From the foregoing it can be seen that it is a primary object of the present invention to provide an improved photodiode configuration for a light meter.

A further object of the present invention to provide a light meter that is formed of a unique pattern of photosensitive elements which improves backlit subject detection.

Another object of the present invention is the provision of a multi-segmented photocell coupled to selection circuitry for the purpose of selecting a combination of the signals from the photocell for processing.

Another object of the present invention is the provision of a light meter that has a symmetrical pattern so that the sensor is orientation insensitive.

Yet another object of the present invention is the provision of a light meter having a pattern that allows for the evaluation of a scene above and below the horizon areas when the camera is held either vertically or horizontally.

Still another object of the present invention is the provision of a light metering system that may be coupled to an autofocus sensor for improved camera system performance.

Another object of the present invention is the provision of a light meter that offers high performance for variable focal length or zoom lens cameras without requiring complicated optics.

These and other objects of the present invention will become more apparent when taken in conjunction with the following description and drawings wherein like characters indicate like parts and which drawings form a part of the present specification.

DESCRIPTION OF THE PREFERRED EMBODIMENTS

Figure 1:
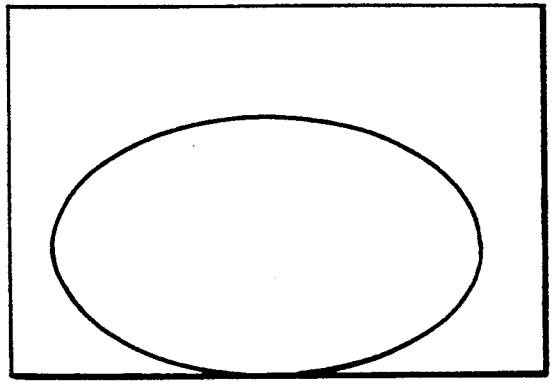
FIG. 1 is a diagram illustrating a prior art photosensitive element with a low center weighted light metering profile.
Figure 2:
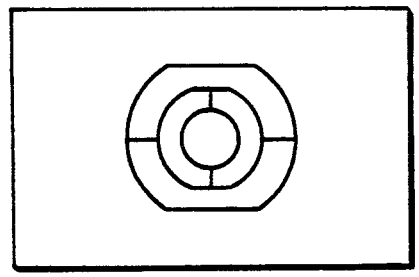
FIG. 2 illustrates the prior art Minolta six-photodiode light metering cell.
Figure 3:
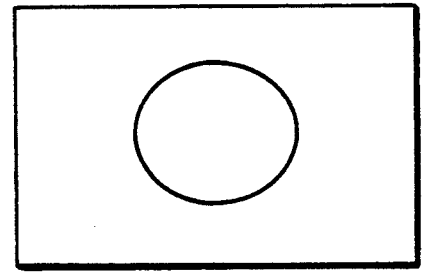
FIG. 3 illustrates the prior art Ricoh two-photodiode light metering cell.
Figure 4:
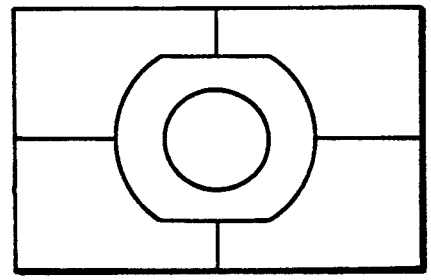
FIG. 4 illustrates the prior art Canon six-photodiode light metering cell.
Figure 5:
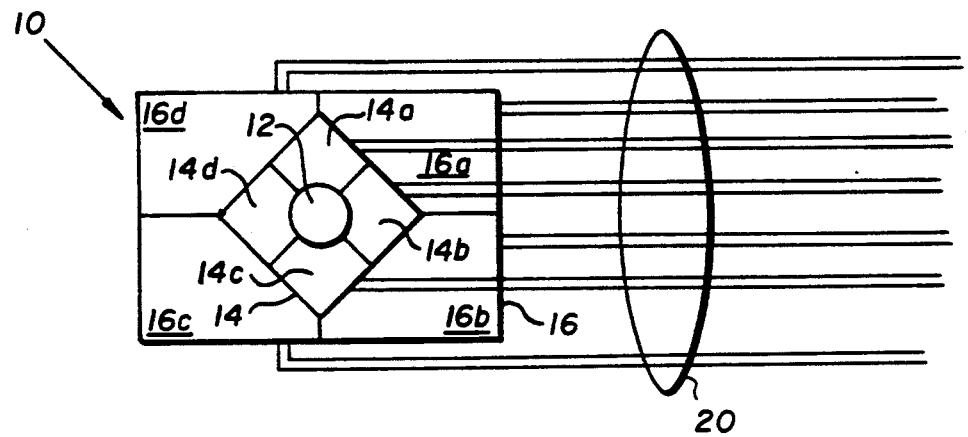
FIG. 5 illustrates the photodiode element arrangement of the light meter of the present invention.

FIGS. 1-4 illustrate various configurations of photosensor elements that have been used in the prior art to provide a more effective light meter. The preferred configuration of the photosensor elements of the present invention is illustrated in FIG. 5. The photodiode array 10 is comprised of a central circular photosensor element 12 surrounded by a rectangular area 14 filled with four equal sized photosensor elements 14a-14d. Surrounding the first area 14 is a second rectangular area 16 that is filled with photosensor elements 16a-16d. Within the second rectangular area the photsensor elements of the first rectangular area are positioned half-orthogonally, i.e., at substantially 45° rotation, as a diamond. Each photosensitive area provides an independent signal indicative of the illumination that impinges on its surface. These signals are coupled via conductors 20 to a multiplexer 44 (shown in FIG. 6).

Figure 6:
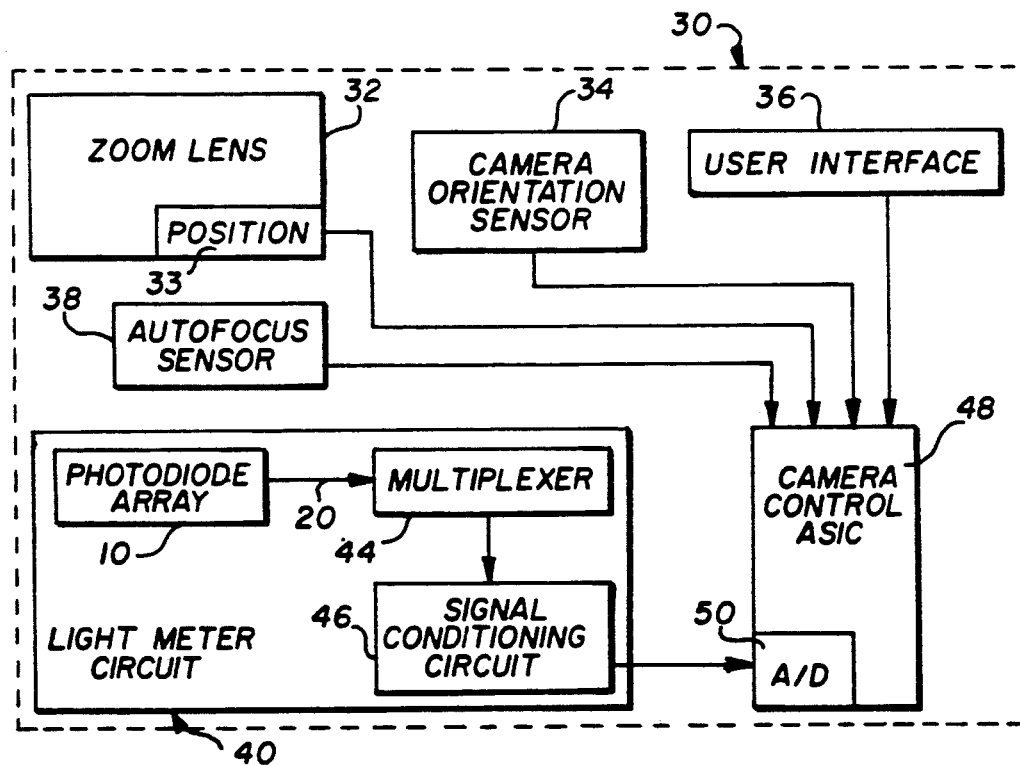
FIG. 6 illustrates in block diagram form the photodiode arrangement of FIG. 5 integrated into a camera.
Figure 7A:
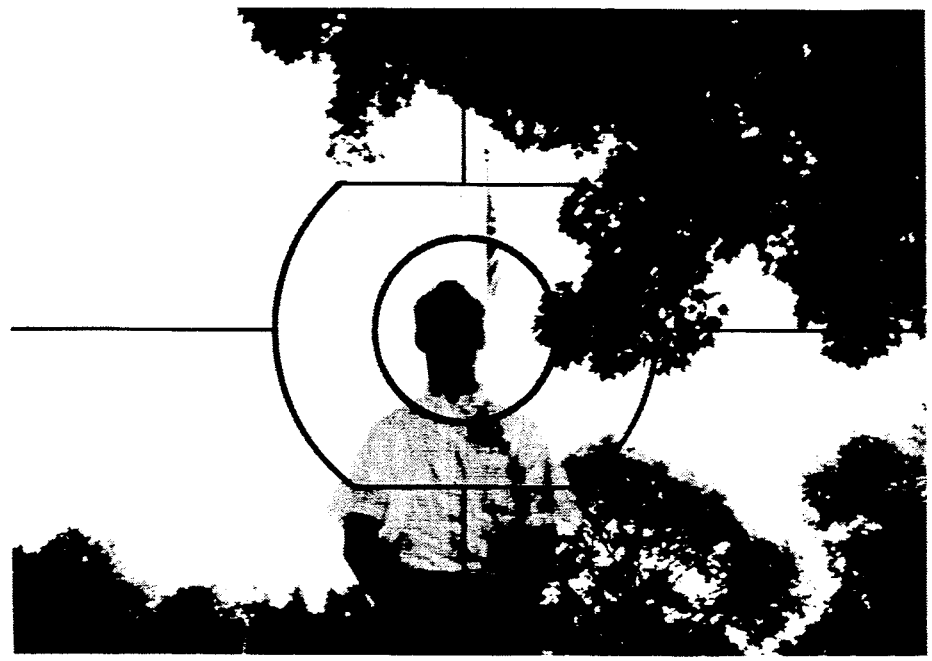
FIGS. 7A and 7B illustrate, for a multiple backlit subject scene, the coverage between a prior art photodiode arrangement and the photodiode arrangement of the present invention, respectively.
Figure 7B:
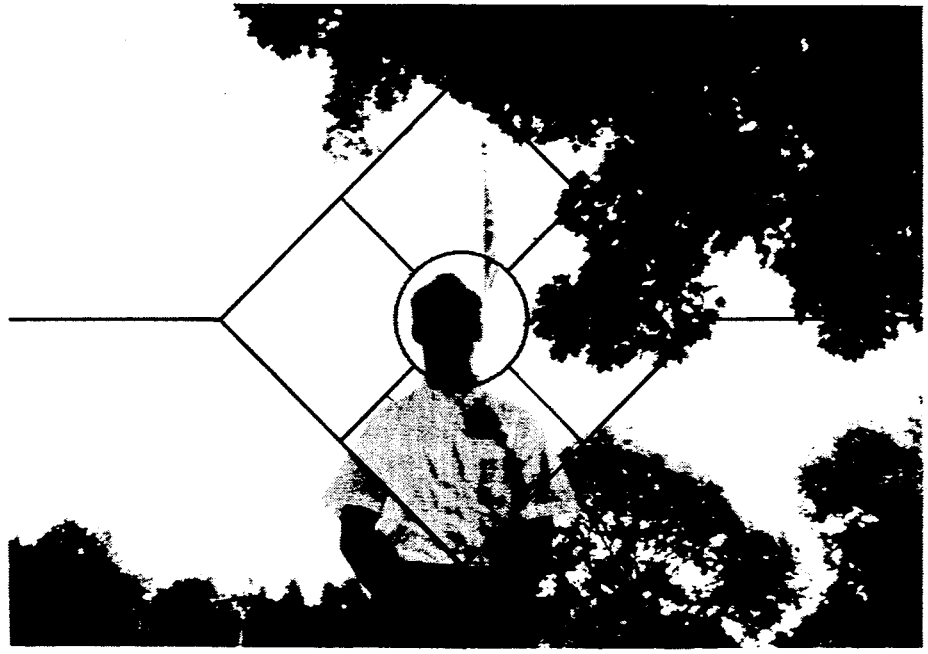

FIG. 6 depicts in block diagram form a camera system 30 incorporating a light metering circuit 40. The light metering circuit is comprised of a photodiode array 10, a multiplexer 44, and a signal conditioning circuit 46. The pattern of the photodiode array 10 is that shown in FIG. 5. In this configuration, the photodiodes are non-integrating, that is, their photon-induced current instantaneously represents the intensity of light impinging on them. The photocurrents from each photodiode element in the array 10 are multiplexed by multiplexer 44 into the conventional signal conditioning circuit 46 which performs a current to voltage conversion, an amplification, and a logarithmic compression. These functions can be accomplished with any of a number of conventional operational amplifiers which substantially meet the ideal requirements of infinite input impedance, zero output, zero input bias current, zero input offset voltage, voltage gain of infinity, and high gain-bandwidth product. From the signal conditioning block 46, the photodiode signals are converted from analog to digital form by an A/D converter 50 and passed to a camera control ASIC 48. The preferred implementation for the camera control 48 is a microprocessor, such as the Motorola 68HC805B6 which has a built-in A/D converter. The camera control ASIC also receives inputs from other camera transducers, such as an autofocus sensor 38, a camera orientation sensor 34 and a camera-user interface 36. The user interface may be as simple as a shutter button or may embody additional features such as multiple light metering modes. If the camera is a telephoto or zoom model, the taking lens focal length may also be accessed by the camera control ASIC from the zoom lens 32 and the zoom position indicator 33.

All light meter circuits need a means to remove intensity variation from light sources driven by AC power. This is conventionally done by passing the signal through a low pass filter (not shown) or by taking repetitive samples of the intensity and averaging out the variation. The first technique is slow to stabilize on power-up and also slow when switching between photocurrents of significantly different levels. The second approach is fast, but requires digital processing capability. For the configuration of light meter circuit described, the second approach is used. When the user turns on the camera and transmits, via the user-interface, his desire to take a picture, the camera control ASIC directs the multiplexer 44 to connect a first photodiode from the array 10 into the light meter circuit. The instantaneous intensity from that diode is conditioned, digitized and stored in a memory (in this case, internal to the camera control IC). Each photodiode is read a number of times to average out the 60 Hz period of 16.667 msec. The averaged value is then used in a light metering algorithm. This process is repeated for each photodiode in the array 10. Depending on the conversion speed of the A/D circuit 50, the multiple samples of all or many of the photodiodes can be accomplished within a single 16.667 msec period.

Once the light intensity data are in memory, a number of known algorithms can be applied to utilize the information from this photodiode pattern. For example, in the 'matrix' light metering mode, all diode data are used in the evaluation. It is common for matrix light metering algorithms to determine the contrast in the scene by computing the differences in signal values between the segments. Sometimes, depending on the relative locations of the brightest and darkest segments, and sometimes depending on the intensity of the center spot, the scene is classified as a particular type. Each type has associated segment weighting factors derived from statistical analysis of photographic scenes. The exposure value may then be determined by $$EV = \sum_{i=1}^{9} c(i)I(i)$$

where c(i) are the combined calibration and statistical weighting factors and I(i) are the photodiode intensity values.

In the spot metering mode, the camera control ASIC directs the multiplexer to connect only the photodiode 12 in the center spot into the light meter circuit. The exposure value is then determined by $$EV = cI$$

where c is a calibration correction factor and I is the center photodiode intensity value.

This described photodiode pattern has numerous attributes to its spatial design. The photodiode pattern is rotationally symmetric. With this pattern, any light metering algorithm can be made insensitive to camera rotation. To accomplish this, the camera control ASIC 48 would check the camera orientation sensor 34, which sensor in the simplest form may be a mercury switch. Typically, the camera algorithms are programmed for data gathered in the normal camera horizontal orientation. If the orientation sensor 34 indicates that the camera has been rotated, perhaps for a vertical picture, then the symmetry of the photodiode pattern allows complete correction. The correction can be performed by directing the multiplexer 44 to connect the photodiode segments to the light meter in an order that would result in the segment from the upper left of the scene being stored in a memory location that always receives that scene reading (and similarly for the other segments). The correction may also be performed by capturing the segment readings and then sorting them based on the camera orientation. And further, the correction may be accomplished by assigning a location tag to each segment reading so that the algorithm can make the proper inferences with orientation insensitivity.

The four largest photodiodes 16A-16B are of equal area, and are formed by dividing the surrounding area into quarters. This arrangement is important because it allows scenes to be analyzed for the brightness of the sky. Significantly different reflection factors must be applied to bright and overcast sky conditions. Statistically, the diamond-shaped areas filled by photodiode elements 14A-14D exclude sky and other extraneous scene content better than patterns of the prior art. This provides better metering of subjects, without influence of extraneous sky.

Recently, cameras have reduced focusing failures with 'multi-spot' or 'multi-subject' autofocus sensors. These sensors can detect off-center subjects, and situations with two persons, where single spot AF would fail. The photodiode pattern provides for additional camera performance improvement through the intelligent coupling of the autofocus sensor output with the results from the light meter circuit. When the subject is detected in the center of the scene, the center photodiodes, for example, photodiodes 12, and 14A-14D can be given emphasis in determining the best exposure value for the scene. When off-center subjects are detected, the corresponding photodiode element location can be emphasized instead. The diamond and corner segment areas of 14 and 16 give additional locations to allow for autofocus coupling. Thus, the camera can do a better job of exposing for the subject.

Cameras with telephoto or zoom lenses allow the user to modify the composition of the picture by changing the taking lens focal length and in doing so, changing the field of view of the scene. Ideally, the light meter (photodiode array 10) should have the same field of view as the film will have. In SLR cameras, this is accomplished by through-the-lens (TTL) light metering which relays identical images to the film plane and the light meter array. In NSLR cameras, the field of view to the light is normally fixed. This introduces potential for error in light metering. Particularly, detecting contrast situations is difficult in these circumstances because the desired part of the scene is relayed onto a few of the photodiode segments. The additional segmentation around the center spot in the new pattern remedies this problem. In the design of the imaging lens and the photodiode array, the field of view and segmentation are adjusted so that at maximum zoom or telephoto position, the diamond and center spot are metering the scene. The camera control ASIC can utilize this pattern as a five-spot light meter and process the exposure determination algorithm accordingly. For zoom positions between maximum and minimum, the emphasis on the outermost segments can be correspondingly adjusted by scaling the statistical weighting factors applied to the segment readings. Thus, metering performance is enhanced by implementing an electronically adjustable field of view. This is simpler than implementing an actual zoom lens capability for the photodiode imaging path.

For the purposes of showing further improvements, a comparison of this new pattern will be made against prior art patterns. The examples in FIGS. 7A,7B and 8A,8B show pairs of scenes with the photodiode patterns overlaid.

Figure 8A:
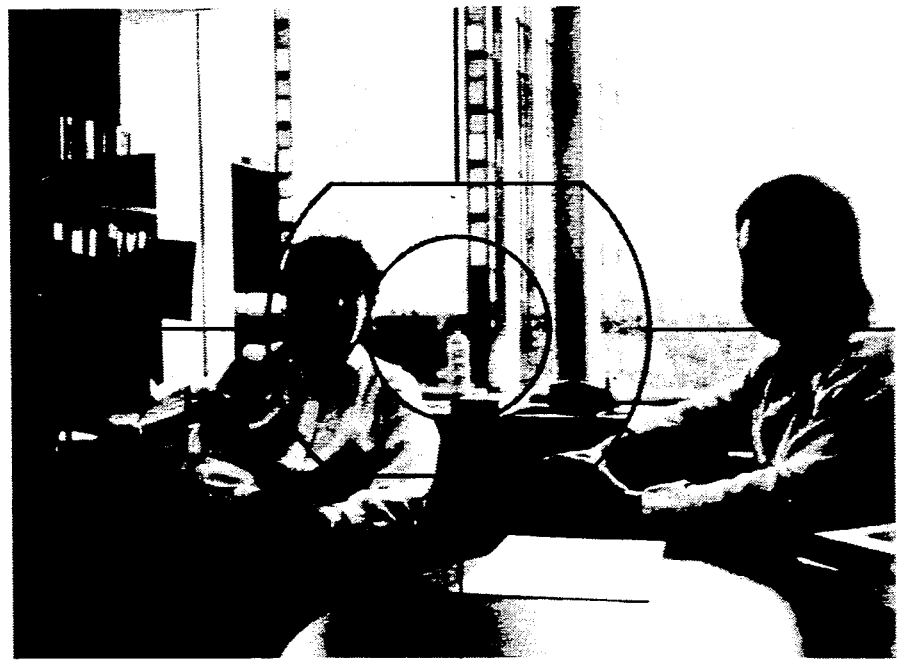
FIGS. 8A and 8B illustrate, for a multiple subject scene, the coverage between a prior art photodiode arrangement and the photodiode arrangement of the present invention, respectively.
Figure 8B:

The new pattern is particularly better at detecting either backlit or spotlit situations. This is valid for both single persons and multiple persons. In the simplest case, illustrated in FIG. 7A a single person stands in the center of the picture with the head and body not dominating any of the segments that attempt to detect them. With the new pattern, illustrated in FIG. 7B, the diamond segment beneath the center spot is effectively measuring the intensity of the body. The examples of FIGS. 8A and 8B depict multiple subjects. The diamond pattern of FIGS. 7B and 8B statistically measures an accurate light intensity on subjects more often than prior art patterns. From the foregoing it can be seen that there has been disclosed an improved photodiode detection array.

While there has been shown what is considered to be the preferred embodiment of the invention, it will be manifest that many modifications may be made therein without departing from the essential spirit of the invention. It is intended, therefore, in the annexed claims to cover all such changes and modifications as may fall within the true scope of the invention.

We claim:

1. An improved multiple photosensitive element array particularly adapted for use in a camera for metering the light from a scene comprising:
    a central photosensitive means defining a central light-sensing area and having at least one photosensitive element;
    a first plurality of photosensitive elements substantially surrounding the central photosensitive area wherein selected elements of the first plurality define a first set of light-sensing quadrants;
    a second plurality of photosensitive elements substantially surrounding the first plurality of photosensitive elements wherein selected elements of the second plurality define a second set of light-sensing quadrants;
    wherein the quadrants of the first set being rotated half-orthogonally with respect to the quadrants of the second set, said first and second sets being concentric with the central light-sensing area, and
    each of said photosensitive elements provides an output signal as a function of the light impinging thereon.

2. The improved multiple photosensitive element array of claim 2 wherein said central photosensitive element is circular in shape.

3. The improved multiple photosensitive element array of claim 1 and further comprising:
    camera control means for receiving input signals and for controlling camera functions in response to the received input signals; and
    means for selectively coupling the output signals from each of said photosensitive elements to said camera control means.

4. The improved multiple photosensitive element array of claim 3 wherein said means for selectively coupling is comprised of:
    a multiplexer having as selectable inputs the output signals from each of said photosensitive elements; and signal conditioning means for providing the signals selected by said multiplexer to said camera control means.

5. The improved multiple photosensitive element array of claim 3 and further comprising camera orientation sense means for providing signals indicative of the orientation of the camera to said camera control means for controlling the photosensitive element output signals.

6. The improved multiple photosensitive element array of claim 5 wherein said orientation sense means comprises a mercury switch.

7. The improved multiple photosensitive element array of claim 3 and further comprising:
   means for locating the photosensitive element array with respect to an optical assembly, such that said scene light is received by the array from the optical assembly; and
   means for providing a signal to said camera control means indicative of the position of the optical assembly relative to a camera reference; and
   means for controlling the signals from the photosensitive elements as a function of the optical assembly position signal.

8. The improved multiple photosensitive element array of claim 3 and further comprising autofocus means for providing an autofocus signal to said camera control means, the autofocus signal being a function of the distance from the camera to a scene object.

9. The improved multiple photosensitive element array of claim 3 and further comprising user interface means for providing operator-selected control signals to said camera control means.

10. The improved multiple photosensitive element array of claim 3 wherein said camera control means is a microprocessor.

11. The improved multiple photosensitive element array according to claim 7, wherein the outer perimeter of said first plurality of photosensitive elements define a regular polygon.

12. The improved multiple photosensitive element array according to claim 11, wherein said regular polygon is a square.

13. The improved multiple photosensitive element array according to claim 12 wherein said second plurality of photosensitive elements is oriented with respect to the horizon when the camera is held horizontally such that a line passing through two opposing corners of said square is parallel to the horizon.

14. The improved multiple photosensitive element array according to claim 12, wherein said central light-sensing area has a circular shape and a predetermined diameter, and each of said first plurality of photosensitive elements is arranged symmetrically about a line coincident with the diameter.

15. The improved multiple photosensitive element array according to claim 11, wherein the outer perimeter of said plurality of second photosensitive elements defines a regular polygon.

16. The improved multiple photosensitive element array according to claim 11, wherein said regular polygon is a square, and wherein the outer perimeter of said second plurality of photosensitive elements defines a regular polygon.

* * * * *